US012790528B2

(12) United States Patent
Gutsulyak et al.

(10) Patent No.: US 12,790,528 B2
(45) Date of Patent: Nov. 10, 2026

(54) COATED ADHESION ENHANCEMENT COMPOSITIONS

(71) Applicant: L.B FOSTER RAIL TECHNOLOGIES, CORP, Burnaby (CA)

(72) Inventors: Dmitry Gutsulyak, Burnaby (CA); Louisa Stanlake, Burnaby (CA)

(73) Assignee: L. B. Foster Rail Technologies, Corp., Barnaby (CA)

( * ) Notice: Subject to any disclaimer, the term of this patent is extended or adjusted under 35 U.S.C. 154(b) by 702 days.

(21) Appl. No.: 17/614,221

(22) PCT Filed: May 21, 2020

(86) PCT No.: PCT/CA2020/050685

§ 371 (c)(1),
(2) Date: Nov. 24, 2021

(87) PCT Pub. No.: WO2020/232551

PCT Pub. Date: Nov. 26, 2020

(65) Prior Publication Data

US 2022/0348807 A1 Nov. 3, 2022

Related U.S. Application Data

(60) Provisional application No. 62/851,225, filed on May 22, 2019.

(51) Int. Cl.

| | |
|---|---|
| ***C09K 3/14*** | (2006.01) |
| ***B61C 15/08*** | (2006.01) |

(52) U.S. Cl.
CPC .............. *C09K 3/149* (2013.01); *B61C 15/08* (2013.01)

(58) Field of Classification Search
CPC .......... C09K 3/149; B61C 15/08; B61C 15/00
See application file for complete search history.

(56) References Cited

U.S. PATENT DOCUMENTS 2,787,967 A 4/1957 Nohejl
2,877,716 A 3/1959 Ryznar
(Continued)

FOREIGN PATENT DOCUMENTS

CA 2227351 9/2003
CA 2381678 10/2003
(Continued)

OTHER PUBLICATIONS

Ando, JP-2014034838-MT (Year: 2014).*
(Continued)

*Primary Examiner* — Robert S Jones, Jr.
*Assistant Examiner* — Zhen Liu
(74) *Attorney, Agent, or Firm* — Paul D. Bangor, Jr.; Clark Hill PLC

(57) ABSTRACT

A coated composition for increasing adhesion between two surfaces that are in sliding, slipping, rolling-sliding or rolling-slipping contact with each other, the composition comprising: (a) a core, the core comprising one or more than one hard particle, each of the one or more than one hard particle having a Mohs hardness value of equal to or greater than 5, or a Vickers hardness of greater than or equal to 1000 and selected from the group of garnet, copper slag, silica sand, bauxite, $Al_2O_3$, staurolite, olivine, goethite, coal slag, MgO and $Fe_2O_3$, the core comprising about 70% to about 99.8% (wt/wt) of the composition; and (b) a coating over the core, the coating over the core comprising a resin and a conductivity additive, the resin comprising about 0.1% to about
(Continued)

20% (wt/wt) of the composition, and the conductivity additive comprising about 0.1% to about 10% (wt/wt) of the composition.

12 Claims, 8 Drawing Sheets

(56) References Cited

U.S. PATENT DOCUMENTS

| | | | | |
|---|---|---|---|---|
| 2,995,393 | A | 8/1961 | Charp | |
| 3,120,818 | A | 2/1964 | Lyons, Jr. | |
| 3,867,647 | A | 2/1975 | Callahan et al. | |
| 4,071,282 | A | 1/1978 | Callahan et al. | |
| 4,431,227 | A | 2/1984 | Howell | |
| 5,308,516 | A | 5/1994 | Chiddick | |
| 5,919,295 | A | 7/1999 | Lamba et al. | |
| 6,722,589 | B1 | 4/2004 | Ohno et al. | |
| 7,311,274 | B2 | 12/2007 | Ohno et al. | |
| 8,450,254 | B2 | 5/2013 | Eadie et al. | |
| 10,815,320 | B2 * | 10/2020 | Anderson | C08F 12/22 |
| 2002/0009622 | A1 * | 1/2002 | Goodson | C04B 28/34<br>428/689 |
| 2003/0013615 | A1 * | 1/2003 | Levy | F16C 33/109<br>508/113 |
| 2003/0195123 | A1 | 10/2003 | Cotter | |
| 2004/0053790 | A1 * | 3/2004 | Cotter | C10M 129/40<br>508/591 |
| 2010/0113670 | A1 * | 5/2010 | Audenaert | C09D 177/00<br>524/425 |
| 2013/0025500 | A1 | 1/2013 | Jones | |
| 2013/0092788 | A1 * | 4/2013 | Olsen | F16F 1/3835<br>244/54 |
| 2013/0288004 | A1 * | 10/2013 | Zheng | B82Y 30/00<br>428/327 |
| 2020/0102484 | A1 * | 4/2020 | Gutsulyak | B61C 15/08 |

FOREIGN PATENT DOCUMENTS

| | | | | | |
|---|---|---|---|---|---|
| CA | 2894931 | | 7/2014 | | |
| CA | 3054654 | | 9/2018 | | |
| CN | 101381484 | | 3/2009 | | |
| GB | 2459193 | | 10/2009 | | |
| GB | 2459290 | | 10/2009 | | |
| JP | 2014034838 | A * | 2/2014 | | |
| WO | 2002/026919 | | 4/2002 | | |
| WO | 2018/157226 | | 9/2018 | | |
| WO | 2018/157252 | | 9/2018 | | |
| WO | WO-2018157226 | A1 * | 9/2018 | | B61C 15/08 |

OTHER PUBLICATIONS

Form PCT/ISA/210, PCT International Search Report for International Application No. PCT/CA2020/050685, Date Mailed Jul. 2019.

* cited by examiner

COATED ADHESION ENHANCEMENT COMPOSITIONS

TECHNICAL FIELD

The present invention relates to coated adhesion and friction enhancement compositions for applying to steel surfaces that are in sliding, slipping, rolling-sliding or rolling-slipping contact Methods for enhancing adhesion or increasing friction between two steel surfaces in sliding, slipping, rolling-sliding or rolling-slipping contact are also provided.

BACKGROUND

Sufficient minimum adhesion between two steel surfaces in sliding, slipping, rolling-sliding or rolling-slipping contact, for example a train wheel and a rail as used in freight, passenger, and mass transit train systems, is required for safe and effective train operation The coefficient of friction obtained between the two steel surfaces varies, in part, upon the environmental conditions and contamination to which the rail and wheel are exposed. Variation in conditions of the rail or wheel may alter the frictional forces generated between the train wheel and the rail, and varied conditions may also impact the adhesion levels that exist between the train wheel and the rail as the wheel passes over the rail. Contamination of the train wheel and rail interface by water, dew, snow, rust and wear debris, organic debris, fallen leaves, grease, oil, or a combination of these contaminants, typically decreases the adhesion level between train wheels and rail Low adhesion conditions between the train wheels and the rail may result in poor train performance arising from an increased sliding between the wheel-rail surfaces, increased braking distance, reduced train acceleration, and an inability to maintain sufficient tractive effort Slip—slide can cause a problem to some signalling systems due to a mismatch between distance travelled and wheel rotations. Poor control of braking can cause station overruns and service interruptions. Insufficient tractive effort can lead to freight trains stalling on heavy grades.

To overcome low adhesion levels between train wheels and the rail, high-speed water pressure jets may be used. However, some contamination, for example, leaf contamination, may be tenaciously bonded to the rail, may be localized along the rail, and the contaminated depth may vary and the amount of material to be removed from the rail head using pressurized jets may be inconsistent. Rail grinding may be used on some track sections to remove contaminated layers that are chemically bonded to the rail material, however, this is a slow and intensive process, the cost is high, and is often hindered by track access and logistical limitations.

Alternate approaches involve the use of sand, which may be dispersed on the rail surface as an adhesion enhancement agent. However, sand application results in increased wear rates of the rail and train wheel surfaces and the use of sand may promote stick-slip oscillations and negative friction characteristics along the rail. Sand is a low conductivity agent and may create electrical isolation between the wheel and rail. Sand is also difficult to handle, can become clogged in dispensing equipment due to absorption of moisture, and in some countries its use is restricted due to health concerns related to small particles of silica. Sand has limited efficiency and effectiveness (often about 4 axles maximum) due to loss of activity when the particles are crushed under the wheel On trains with multiple driven axles, multiple sanders must be installed on the train Lastly, there can be negative environmental and health effects associated with sand. Dispersions of sand suspended in water with a thickening agent (for example, Sandite or other similar materials) may be used to treat areas of rail having low adhesion U.S. Pat. No. 4,431,227 discloses pads adhered to a train wheel The pads comprise a high frictional surface that contacts the rail as the train wheel rolls along the rail The high frictional surface may be coated with industrial diamonds or cermets. Suitable cermets may include oxides of aluminium and silicon, the carbides of silicon and titanium, and the borides of nitrogen and carbon U.S. Pat. No. 5,308,516 discloses friction modifying compositions comprising a resin, a solid lubricant and a friction enhancer, for example calcium carbonate, magnesium silicate, magnesium carbonate, bentonite, coal dust, barium sulphate, asbestos, aluminium silicate, silica, amorphous silica, synthetic silica, natural silica, slate powder, diatomaceous earth, ground quartz, zinc stearate, aluminium stearate, zinc oxide, iron oxide, antimony oxide, dolomite, lead carbonate, calcium sulphate, calcium sulphate, nepthalene synemite, and polyethylene fibres.

WO 2002/026919 discloses friction control compositions comprising water, a rheological agent (e.g clay, casein carboxymethylcellulose), a retentivity (film-forming) agent, an optional lubricant, and an optional friction modifying material that imparts a positive friction characteristic and increase in the friction coefficient between two surfaces. Friction modifying materials include calcium carbonate, magnesium carbonate, magnesium silicate, clay, ground coal, calcium sulphate, asbestine derivative of asbestos, aluminium silicate, amorphous silica (synthetic), slate powder, diatomaceous earth, zinc stearate, aluminium stearate, magnesium carbonate, lead oxide, basic lead carbonate, zinc oxide, antimony oxide, dolomite, calcium sulphate, barium sulphate (e g. Baryten), polyethylene fibres, aluminum oxide, red iron oxide ($Fe_2O_3$), black iron oxide ($Fe_3O_4$), magnesium oxide and zirconium oxide U.S. Pat. No. 5,919,295 discloses an adhesion enhancing mixture that contains a hard particle constituent preferably including alumina; a soft particle constituent preferably including titania; and an iron oxide constituent In a preferred embodiment, bauxite is used as the primary component of the mixture The mixture may be in the form of a dry powder, a paste with water or an alcohol vehicle, or a metal composite that includes the powder.

U.S. Pat. No. 6,722,589 discloses an injector device for applying slip prevention particles. The slip prevention particles may include natural sand, silica sand, alumina particles, metal particles, and ceramic particles like mullite (i e $3Al_2O_3 \cdot 2SiO_2$ or $2Al_2O_3 \cdot SiO_2$) having a diameter of 10-500 micrometers. The particles are mixed with water and sprayed onto a rail using the injector device.

CN 101381484 discloses a synthetic material capable of enhancing the friction coefficient between two surfaces; the material comprises rubber, steel fibres, magnesium oxide, calcined petroleum coke, silicon carbide, barium sulfate, graphite, and molybdenum disulfide U.S. Pat. No. 7,311,274 describes an anti-slip material ejector for ejecting materials that include natural sand, silica sand, alumina, mullite, ceramic particles such as silicone carbide, and metallic particles such as those of chrome, tungsten, and molybdenum.

GB 2459193 discloses an adhesion improver/friction modifier for improving the traction of trains travelling along rails which comprises a mixture of sand, metal particles and a rheology modifier, or sand, a chelating agent and a rheology modifier. The rheology modifier may be a hydrocolloid or a gum, and the metal particles may be steel shot The chelating agent may be potassium hydroxide and/or phosphoric acid.

WO 2018/157226 and WO 2018/157252 describe compositions for increasing adhesion between two surfaces that are in sliding, slipping, rolling-sliding or rolling-slipping contact The mixtures comprise a component having a Mohs hardness value of equal to or greater than 7, and one or more than one organic rheology additive.

Adhesion enhancement compositions generally perform with varying levels of effectiveness depending on the contaminant at issue (e g oil, grease, water, organic debris), and the quantity, or rate, that the adhesion enhancement composition is applied to the rail. For example, some adhesion enhancement compositions perform well against some contaminant conditions, but not others Similarly, some adhesion enhancement compositions perform well at certain application rates or quantities, but not others Regardless, the compositions described above have several drawbacks The dry, solid particle mixtures described above tend to segregate during use due to differences in particle size, shape and density of different components, and may result in blocking applicators and/or non-uniform deposition of the components on the rail Liquid water- and solvent-based compositions are usually stabilized with dispersing agents, rheology modifiers, to form suspensions. However, such formulations tend to separate or settle over time for various reasons, for example, bacteria growth, chemical decomposition or reactions, and other external forces Additionally, as components of the mixture are distributed within the mixture, the desired effect of one or more of the components may be reduced, or not realized, depending upon how the mixture interacts with the treatment surfaces, and which components are made available to the various surfaces that are being treated. The liquid water-based and solvent-based formulations also have a narrow operational temperature range, which is determined by the freezing point, stability and rheological properties of the composition. Use of these compositions can produce an initial significant reduction in friction between the wheels and rail due to the presence of water or solvent until evaporation of these volatile components. Similarly, the presence of a significant amount of resin (for example, greater than 20%) in the compositions and lubricants in solid stick products may also result in low friction levels upon application. Lastly, both liquid and solid stick formulations require special application equipment as they cannot be applied to the rail through conventional sanders.

SUMMARY

The present invention relates to coated adhesion enhancement compositions for applying to steel surfaces that are in sliding, slipping, rolling-sliding or rolling-slipping contact. Methods for enhancing adhesion between two steel surfaces in sliding, slipping, rolling-sliding or rolling-slipping contact are also provided As described herein there is provided a composition for increasing adhesion (an adhesion enhancement composition) between two surfaces that are sliding, slipping, rolling-sliding or rolling-slipping contact with each other, the composition comprising a coated particle.

The coated adhesion enhancement composition may comprise (a) a core, the core comprising one or more than one hard particle, each of the one or more than one hard particle having a Mohs hardness value of equal to or greater than 5, or a Vickers hardness of greater than or equal to 1000 and selected from the group of garnet, copper slag, silica sand, bauxite, $Al_2O_3$, staurolite, olivine, goethite, coal slag, MgO and $Fe_2O_3$, the core comprising about 70% to about 99 8% (wt/wt) of the composition, and (b) a coating over the core, the coating comprising a resin and a conductivity additive, the resin comprising about 0 1% to about 20% (wt/wt) of the composition, and the conductivity additive comprising about 0 1% to about 10% (wt/wt) of the composition.

As described herein there is also provided a composition comprising (a) a core, the core comprising one or more than one hard particle, each of the one or more than one hard particle having a Mohs hardness value of equal to or greater than 5, or a Vickers hardness of greater than or equal to 1000, the core comprising about 70% to about 99.8% (wt/wt) of the composition, and (b) a coating over the core, the coating comprising a resin and a conductivity additive selected from the group of carbon black and steel powder, the resin comprising about 0.1% to about 20% (wt/wt) of the composition, and the conductivity additive comprising about 0.1% to about 10% (wt/wt) of the composition The methods described herein include a method of increasing adhesion between two steel surfaces that are in sliding, slipping, rolling-sliding or rolling-slipping contact with each other, the method comprising applying a composition to a rail surface at a rate sufficient to increase the adhesion between the two steel surfaces, the composition comprising (a) a core, the core comprising one or more than one hard particle, each of the one or more than one hard particle having a Mohs hardness value of equal to or greater than 5, or a Vickers hardness of greater than or equal to 1000, the core comprising about 70% to about 99.8% (wt/wt) of the composition; and (b) a coating over the core, the coating comprising a resin and a conductivity additive, the resin comprising about 0.1% to about 20% (wt/wt) of the composition, and the conductivity additive comprising about 0.1% to about 10% (wt/wt) of the composition.

As described herein there is also provided a method of decreasing wheel slide and wheel slip in a rail system, the method comprising applying a composition to a rail surface at a rate sufficient to increase traction between a wheel and the rail surface, the composition comprising (a) a core, the core comprising one or more than one hard particle, each of the one or more than one hard particle having a Mohs hardness value of equal to or greater than 5, or a Vickers hardness of greater than or equal to 1000, the core comprising about 70% to about 99.8% (wt/wt) of the composition; and (b) a coating over the core, the coating comprising a resin and a conductivity additive, the resin comprising about 0.1% to about 20% (wt/wt) of the composition, and the conductivity additive comprising about 0.1% to about 10% (wt/wt) of the composition Also provided herein is a coated composition for increasing adhesion between two surfaces that are in sliding, slipping, rolling-sliding or rolling-slipping contact with each other, the composition comprising:

(a) a core comprising one or more than one hard particle, each of the one or more than one hard particle having a Mohs hardness value of equal to or greater than 5, or a Vickers hardness of greater than or equal to 1000 and selected from the group of garnet, copper slag, silica sand, bauxite, $Al_2O_3$, staurolite, olivine, goethite, coal slag, MgO and $Fe_2O_3$, the core comprising about 50% to about 99.8% (wt/wt) of the composition; and (b) a coating over the core, the coating comprising i) a resin comprising about 0.1% to about 20% (wt/wt) of the composition;

ii) a conductivity additive comprising about 0 1% to about 10% (wt/wt) of the composition;

iii) a rheological additive comprising from 0 to about 10% (wt/wt) of the composition, iv) an anti-wear additive comprising from 0 to about 10% (wt/wt) of the composition;

v) a hydrophobic additive comprising from 0 to about 10% (wt/wt) of the composition;

vi) a hydrophilic additive comprising from 0 to about 10% (wt/wt) of the composition;

vii) an anti-dust, anti-static, or both, additive comprising from 0 to about 10% (wt/wt) of the composition; and viii) another additive comprising from 0 to about 10% (wt/wt) of the composition. For example, the core may comprise about 70% to about 99 8% (wt/wt) of the composition.

An alternate coated composition for increasing adhesion between two surfaces that are in sliding, slipping, rolling-sliding or rolling-slipping contact with each other is also described The alternate composition comprises (a) a core, the core comprising one or more than one hard particle, each of the one or more than one hard particle having a Mohs hardness value of equal to or greater than 5, or a Vickers hardness of greater than or equal to 1000, the core comprising about 50% to about 99.8% (wt/wt) of the composition; and (b) a coating over the core, the coating comprising i) a resin comprising about 0 1% to about 20% (wt/wt) of the composition;

ii) a conductivity additive comprising about 0.1% to about 10% (wt/wt) of the composition, the conductivity additive selected from the group of carbon black and steel powder;

iii) a rheological additive comprising from 0 to about 10% (wt/wt) of the composition;

iv) an anti-wear additive comprising from 0 to about 10% (wt/wt) of the composition;

v) a hydrophobic additive comprising from 0 to about 10% (wt/wt) of the composition, vi) a hydrophilic additive comprising from 0 to about 10% (wt/wt) of the composition;

vii) an anti-dust, anti-static, or both, additive comprising from 0 to about 10% (wt/wt) of the composition, and viii) another additive comprising from 0 to about 10% (wt/wt) of the composition. For example, the core may comprise about 70% to about 99.8% (wt/wt) of the composition.

As described herein, by having a coated adhesion enhancement composition comprising a core made up of one or more than one hard particle and a coating over the core that comprises a resin and a conductivity additive, application of the coated adhesion enhancement composition to one or more surfaces ensures that the components in the outer layer of the composition will initially interact with the surfaces For example, as the outer layer of the coated adhesion enhancement composition comprises a conductivity additive, then the surfaces that are treated with the coated adhesion enhancement composition will initially interact with the conductivity component of the coated adhesion enhancement composition prior to interacting with the core component that modifies adhesion between the surfaces. In this way, application of the coated (particulate) adhesion enhancement composition ensures that there is no loss of conductivity (contact potential) between the surfaces, for example a steel wheel and a rail Furthermore, as the particulate adhesion enhancement composition comprises a core comprising one or more than one hard particles and a coating over the core that comprises a resin and a conductivity additive, the optimal ratio (by weight; % wt/wt) of hard particles of the core, to the conductivity additive and resin of the coating, can be accurately defined and manufactured. This ensures that the ratio of core to coating material is maintained within a mixture that contains a plurality of coated particles used to treat a surface, and that the various components of the coated adhesion enhancement composition do not separate (e g. due to settling) within the mixture The use of a coated (particulate) adhesion enhancement composition as described herein ensures a consistent result in both achieving a desired conductivity between steel surfaces, for example a wheel and rail, and a constant coefficient of adhesion between these surfaces The particulate adhesion enhancement composition as described herein is also well suited for application to rail and wheel surfaces using readily available sand applicators as would be known to one of skill in the art.

This summary does not necessarily describe the entire scope of all aspects of the disclosure. Other aspects, features and advantages will be apparent to those of ordinary skill in the art upon review of the following description of specific embodiments.

BRIEF DESCRIPTION OF THE DRAWINGS

These and other features of the present disclosure will become more apparent from the following description in which reference is made to the appended drawings:

FIG. 1 shows a schematic view of an example of a particulate adhesion enhancement composition as described herein, comprising a core, a first coating and an optional second coating The particulate adhesion enhancement composition may have a diameter of from 100-4000 um, or any amount there between.

DETAILED DESCRIPTION

The present invention relates to coated adhesion enhancement compositions for applying to steel surfaces that are in sliding, slipping, rolling-sliding or rolling-slipping contact. Methods for enhancing adhesion between two steel surfaces in sliding, slipping, rolling-sliding or rolling-slipping contact are also provided, together with methods for increasing friction between two steel surfaces in sliding, slipping, rolling-sliding or rolling-slipping contact.

Figure 1:
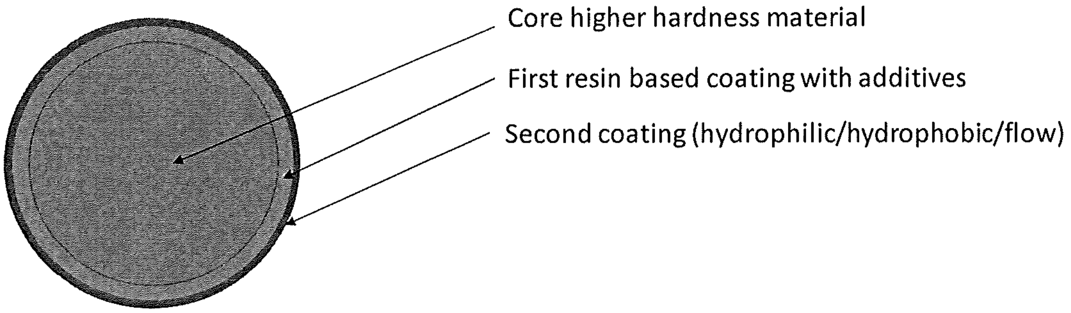

The compositions disclosed herein include coated particles which may overcome one or more of the drawbacks of other adhesion enhancing materials described above. The coated particles may comprise a hard core and a resin-based coating, which may contain certain performance-enhancing additives. A hard particle may be coated with a first resin-based coating, which may contain certain performance-enhancing additives, and if desired, a second coating, which may contain certain additives with hydrophilic, hydrophobic or flow-enhancing properties, as shown in FIG. 1 Multiple layers of different coatings may be applied to the hard particle to achieve a desired performance of the coated adhesion enhancement composition The coated particles may overcome any stability or uniformity problems as all components of the coated adhesion enhancement composition are included within each particle. Furthermore, the compositions disclosed herein do not comprise large amounts of lubricating components, such as water, solvents or resins. The compositions disclosed herein have a wide operating temperature range and since they are particulate, they can be applied to a rail using conventional sanders. Flexibility in the components of the compositions allows for enhancement of certain properties such as electrical conductivity, flow, wear and frictional properties by using different core materials, different additives and different coating materials The coating may also promote interaction of the coated (particulate) composition to the rail/wheel surfaces, for example, by reducing the resilience of the particle, thereby reducing scatter when applied, or by facilitating water absorption by the coated composition. The coating may provide more efficient and/or more precise deposition into the wheel-rail interface due to improved flow properties in and through sanders The present disclosure relates to adhesion and/or friction enhancement compositions for applying to surfaces that are in sliding, slipping, rolling-sliding or rolling-slipping contact with each other, and methods of using the adhesion and/or friction enhancement compositions A non-limiting example of a sliding, slipping, rolling-sliding or rolling-slipping contact system is a train wheel and rail system. For simplicity, but without wishing to be bound only to such a system, portions of this disclosure may be discussed in the context of a train wheel and rail system A skilled person in the art would readily understand that a train wheel and rail system is a non-limiting example of a system comprising surfaces that are in sliding, slipping, rolling-sliding or rolling-slipping contact with each other, and that the compositions disclosed herein may be applicable generally to any system comprising surfaces which are in sliding, slipping, rolling-sliding or rolling-slipping contact with each other. The enhancement of adhesion of the compositions described herein may be observed by comparing application of an adhesion enhancement composition with the application of F50 sand (or garnet or copper slag), to a wheel-rail system when both compositions are applied at the same rate and under the same conditions A composition for increasing or enhancing adhesion between two surfaces that are in sliding, slipping, rolling-sliding or rolling-slipping contact with each other is described herein. In various embodiments, the composition comprises (a) a core, the core comprising one or more than one hard particle, each of the one or more than one hard particle having a Mohs hardness value of equal to or greater than 5, or Vickers hardness of greater than or equal to 1000 and selected from the group of garnet, copper slag, silica sand, bauxite, $Al_2O_3$, staurolite, olivine, goethite, coal slag, MgO and $Fe_2O_3$, and (b) a coating over the core, the coating comprising a resin and a conductivity additive In alternative embodiments, the composition comprises (a) a core, the core comprising one or more than one hard particle, each of the one or more than one hard particle having a Mohs hardness value of equal to or greater than 5, or a Vickers hardness of greater than or equal to 1000, and (b) a coating over the core, the coating comprising a resin and a conductivity additive selected from the group of carbon black and steel powder.

Also described herein is the use of the coated adhesion enhancement compositions described herein for increasing adhesion between two steel surfaces in sliding, slipping, rolling-sliding or rolling-slipping contact. The enhancement of adhesion may be observed by comparing application of the adhesion enhancement composition with the application of the one or more than one hard particle without a coating to a wheel-rail system, when both compositions are applied at the same rate and under the same conditions.

Also described herein is the use of the adhesion enhancement composition comprising the core and the coating over the core for increasing adhesion between two steel surfaces in sliding, slipping, rolling-sliding or rolling-slipping contact The enhancement of adhesion of the adhesion composition may be observed by comparing application of the adhesion enhancement composition with the application of F50 sand (or garnet or copper slag), to a wheel-rail system, when both compositions are applied at the same rate and under the same conditions.

Also described herein is a method of decreasing wheel slide and wheel slip in a rail system by applying a composition comprising a core, the core comprising one or more than one hard particle, each of the one or more than one hard particle having a Mohs hardness value of equal to or greater than 5, or a Vickers hardness of greater than or equal to 1000; and a coating over the core, the coating comprising a resin and a conductivity additive, to one or both of the steel surfaces, at a rate sufficient to increase the adhesion between the two steel surfaces, when compared to the adhesion determined between the two steel surfaces in the absence of application of the adhesion enhancement composition As also shown herein, the adhesion enhancement composition exhibits an increase in adhesion when compared with the application of F50 sand (or garnet or copper slag) at a same rate and under the same conditions.

The properties of the adhesion enhancement agent, either a material or a composition as described herein, provide an improved rate of traction coefficient increase between surfaces that are in sliding, slipping, rolling-sliding or rolling-slipping contact with each other over typical compounds such as railroad sand (F50 sand, garnet or copper slag)

As used herein, the terms "comprising", "having", "including", and "containing", and grammatical variations thereof, are inclusive or open-ended and do not exclude additional, un-recited elements and/or method steps. The term "consisting essentially of" when used herein in connection with a composition, use or method, denotes that additional elements, method steps or both additional elements and method steps may be present, but that these additions do not materially affect the manner in which the recited composition, method or use functions. The term "consisting of" when used herein in connection with a composition, use or method, excludes the presence of additional elements and/or method steps.

Any element expressed in the singular form also encompasses its plural form. Any element expressed in the plural form also encompasses its singular form The use of the word "a" or "an" when used herein in conjunction with the term "comprising" may mean "one", but it is also consistent with the meaning of "one or more", "at least one", and "one or more than one". Directional terms such as "top", "bottom", "upwards", "downwards", "vertically", and "laterally" are used in the following description for the purpose of providing relative reference only, and are not intended to suggest any limitations on how any article is to be positioned during use, or to be mounted in an assembly or relative to an environment As used herein, the term "about" when followed by a recited value means plus or minus 10% of the recited value As used herein, the term "creepage" or "creep" between two steel surfaces in sliding or rolling-sliding contact is the percentage difference between the magnitude of the velocity of the sliding movement of a rail relative to the magnitude of the tangential velocity of the wheel at the point of contact between wheel and rail, assuming a stationary zone of contact and a dynamic rail and wheel.

As used herein, the term "positive friction characteristic" means that the coefficient of friction between two surfaces in sliding or rolling-sliding contact increases as the creepage between the two surfaces increases.

As used herein, the term "hard particle" is a material that is characterized as having a Mohs hardness value of equal to or greater than 5, or a Vickers hardness of greater than or equal to 1000 Examples of a hard particle include but are not limited to garnet, topaz, copper slag, alumina (such as, for example alumina calcined #A-12 #325), silica sand, boron nitride, diamond, nanocrystalline diamond, polymerized $C_{60}$, carbide based compounds, silicon carbide (such as, for example, silicon carbide black #280), boron carbide (such as, for example, boron carbide black #280), bauxite, amphoteric oxide based compounds, $Al_2O_3$, fullerite, staurolite, olivine, goethite, ZnO, steel slag, copper slag, coal slag, MgO, $Fe_2O_3$, zirconium oxide based compounds, alumina zirconia ($Al_2O_3/ZrO_2$), $ZrO_2$, $Al_2O_3$, aluminium oxide white, brown aluminum oxide (such as, for example, brown aluminium oxide #280), or a combination thereof.

The core of the compositions described herein may comprises one or more than one hard particle The hard particle, or the one or more than one hard particle, may have a particle size between about 100 microns and about 2000 microns, or any size therebetween.

The core comprises about 50% to about 99.8% (wt/wt) of the composition or any amount therebetween For example, the core may comprise about 50%, 52%, 54%, 56%, 58%, 60%, 62%, 64%, 66%, 68%, 70%, 71%, 72%, 73%, 74%, 75%, 76%, 77%, 78%, 79%, 80%, 81%, 82%, 83%, 84%, 85%, 86%, 87%, 88% 89%, 90%, 91%, 92%, 93%, 94%, 95%, 96%, 97%, 98%, 98.5%, 99%, 99.1%, 99.2%, 99.3%, 99.4%, 99.5%, 99 6%, 99 7% or 99 8% (wt/wt) of the composition. The resin may comprise about 0.1% to about 20% (wt/wt) of the composition or any amount therebetween For example, the resin may comprise about 0 1%, 0 2%, 0.4%, 0 5%, 0.6%, 0 8%, 1.0%, 1.5%, 2%, 3%, 4%, 5%, 6%, 7%, 8%, 9%, 10%, 12%, 14%, 15% 16%, 18%, or 20% (wt/wt) of the composition The conductivity additive comprises about 0 1% to about 10% (wt/wt) of the composition For example, the conductivity additive comprises about 0 1%, 0 2%, 0 4%, 0 5%, 0.6%, 0.8%, 1.0%, 1.5%, 2%, 3%, 4%, 5%, 6%, 7%, 8%, 9% or 10% (wt/wt) of the composition. The composition may not comprise water.

The adhesion enhancing compositions described herein comprise a polymer or resin as the first coating in an amount between about 0.1% to about 20% (wt/wt), or any amount therebetween, of the composition. Examples of polymers or resins which are not to be considered limiting in any manner include polyurethane, polyurea, epoxy, phenolic, vinyl ester, polyester, acrylic, wax, alkyd or furan. The coated adhesion enhancing compositions may comprise one coating layer that comprises the polymer or resin coating, or the coated particles may comprise more than one layer, wherein at least one of the layers comprises the polymer or resin coating Alternatively, the resin may be a thermosetting resin Examples of suitable thermosetting resins include, but are not limited to, epoxy novolac-based vinyl ester, brominated bisphenol-epoxy vinyl ester, vinyl polyester, bisphenol-epoxy vinyl ester, halogenated isophthalic polyester, isophthalic polyester, halogenated polyester, polystyrene, soybean-derived unsaturated polyester resin, corn resin, acrylated epoxidized soybean oil, epoxidized vegetable oil, maleinated soybean monoglyceride, maleinated hydroxylated soybean oil, natural fish oil, soybean oil, tung oil, and a blend or a combination thereof.

The adhesion enhancing compositions described herein comprise a conductivity additive in the coating, for example, a first coating, in an amount between 0.1% to about 10% (wt/wt), or any amount therebetween, of the composition Examples of conductivity additives which are not to be considered limiting in any manner include carbon black, graphite, metal power (such as aluminum powder or copper powder), $Fe_3O_4$, steel powder, graphene, a conductive polymer, a conductive fiber, a conductive nanomaterial (for example, metal nanoparticles, carbon nanotubes, or graphene), or a combination thereof. The conductivity additive may be mixed with the polymer or resin and applied as the first coating, or if the coated particle comprises more than one layer, then the conductivity additive may be mixed with the polymer or resin and applied as one of the coating layers, for example as an inner (first) or as a outer (second) coating layer. The conductivity additive may have a particle size less than about 500 μm.

The adhesion enhancing compositions described herein may also comprise any one or more of an anti-wear additive, an anti-dust additive, an anti-static additive or other additives to control pH and chelation in an amount from 0 to about 10% (wt/wt) for each additive, or any amount therebetween, of the final composition. The anti-wear, anti-dust additive, anti-static, or other additive may be mixed with the polymer or resin and the conductivity additive and applied as a first coating, or the anti-wear, anti-dust additive, anti-static, or other additive may be mixed with the same or different polymer or resin and applied as a second, or outer coating over a first coating layer comprising the conductivity additive, or the anti-wear, anti-dust additive, anti-static, or other additive may be mixed with the same or different polymer or resin and applied as a first layer, and a second, or outer coating comprising the conductivity additive mixed with a polymer or resin may be applied over the first layer.

Examples of anti-wear additives which are not to be considered limiting in any manner include sulfur-based additives, phosphorus-based additives, zinc dialkyldithiophosphates, graphite, molybdenum disulfide or tungsten disulfide or a combination thereof. The anti-wear additives may have a particle size of less than 500 microns. Examples of anti-dust additives which are not to be considered limiting in any manner include oil-based, polymer or surfactant-based dust suppressants, or a combination thereof. Examples of anti-static additives which are not to be considered limiting in any manner include ionic and non-ionic anti-static agents such as amines and amides; quaternary ammonium, phosphonium or sulfonium salts; esters or ethoxylated amines of phosphoric acid; glycol esters, polyols or a combination thereof. Other additive examples include chelate ligands such as EDTA, ethylenediamine, acetylacetonate and pH additives such as different acids, bases and amphoteric compounds. These other additives may be included in the first, second or both layers of the coated compositions described herein.

As used herein, a "rheology additive" is a material that is able to act as a thickener to change the rheology of water pastes or slurries, which form upon application of the adhesion enhancing composition to a surface having water contamination on its surface, such that the water slurry becomes more viscous (hydrophilic compounds). Non-limiting examples of the rheology additive include an organic polymer absorbent, an acrylic, a superabsorbent polymer, a cellulosic material (for example, carboxymethyl cellulose (CMC), carboxy-hydroxymethyl cellulose (CHMC; METHOCEL™), ethoxymethyl cellulose (EMC)), a polysaccharide (for example, chitosan or a starch), a xanthan gum (for example, Vanzan™, Vanzan™ D, or CCL xanthan gum), a guar gum, or any combination thereof. The rheology additive may have a particle size less than about 500 microns. The rheological additive may be applied to the particles described herein as an outer coating. For example, the particle may comprise a core having one or more than one hard particle that is coated with a polymer or resin mixed with a conductivity additive (and optionally one or more than one other additive as described above), and a rheology additive may be applied as a second, or outer, coating Alternatively, the particle comprising the core and having one or more than one hard particle may be coated with a polymer or resin mixed with a conductivity additive, optionally one or more than one other additive as described above, and a rheology additive and this mixture applied as a first layer The outer coating may also comprise hydrophobic compounds, or other compounds that may affect the flow of the particles, for example, silicone, siloxane, wax based, oil-based, polymeric compounds, surfactant, or a combination thereof, compounds.

Low adhesion tends to be a transitory problem negatively affecting train operation and safety This means that a train may suddenly encounter low adhesion in a certain area of the track, or in a certain area of the track during certain periods of the day, or during certain seasons This can affect either braking or traction. To counter such problems, the rate at which an applied material can increase transitorily low adhesion/traction conditions is an important parameter Provided a material can rapidly increase wheel rail adhesion above a certain minimum level, the upper level may be less important In addition, too high a level of wheel rail adhesion (CoT) can promote excessive wear. For transit vehicles, the minimum level adhesion level for safe and effective operation (as measured on the train) is usually considered to be >0 1, preferably >0.15.

For "high adhesion" AC locomotives used in freight operation, the minimum level of adhesion (traction) is usually considered to be >0 30, or >0 40. On high adhesion locomotives for example with six axles, adhesion levels normally increase from the leading axle (the lowest adhesion) to the final axle. The adhesion enhancement materials or compositions described herein may act in a transient manner, and increase the adhesion levels on all axles but are effective on the first 3 axles bogie (in the case of a 6 axle locomotive).

As used herein, the term "coefficient of traction" (CoT) is the ratio of tangential traction force to normal force (T/N) in the contact area of two surfaces In case of twin disc machine experiments as described herein, the CoT was calculated based on torque applied to the discs and the normal force The materials and compositions described herein were selected as they were observed to provide a rapid increase in CoT under low adhesion conditions. Many materials exhibit high CoT under dry conditions but the same materials may provide a very slow increase in friction when applied under low adhesion conditions Materials, or compositions comprising materials, that provide a slow increase in friction, may eventually provide high friction levels following application However, the length of time to achieve the higher friction levels makes these materials, or compositions comprising these materials, not well suited for use under low adhesion conditions. Similarly, materials, or compositions comprising materials, that exhibit a slow increase in friction following application, and that may provide high friction levels over time, may also require higher application rates to achieve the desired adhesion enhancement effect, when compared to the application rates of the materials, or compositions comprising materials, as described herein Materials that only provide high friction levels may also result in high wear rates of the wheel, rail, or both the wheel and rail surfaces The adhesion enhancing materials, and compositions comprising the adhesion enhancement materials, that exhibit the properties as described herein, provide, in addition to an optional positive friction characteristic, a rapid increase in friction under low adhesion conditions to operational friction levels, which may vary depending on railroad regulations and operating conditions (traction or braking). This property (a rapid increase in the CoT) correlates with a minimum safe level of adhesion under field conditions. Furthermore, the materials, or compositions comprising materials as described herein also exhibit the property of not increasing wheel and/or track wear to the same extent as railroad sand (F50 sand).

As used herein, the term "adhesion" is a force acting at the rail-wheel interface. Adhesion is a transmitted tangential force in the longitudinal direction between the railway wheel and the rail (see for example D I. Fletcher, S. Lewis, Creep curve measurement to support wear and adhesion modelling, using a continuously variable creep twin disc machine, Wear. 298-299 (2013) 57-65). The tangential force may be reduced in the presence of contaminants for example, water, dew, water debris mixtures, water debris paste, snow, snow debris mixtures, high humidity, organic debris, leaves, ground leaves, ground leaves/water paste, oil, grease, or a combination thereof. Other factors may also impact adhesion for example, train speed (with the adhesion coefficient decreasing with increased speed), temperature of the steel surface (adhesion coefficient decreases with increased temperature), surface topography of the rail surface or wheel surface (smooth surfaces generally having a lower adhesion coefficient compared with rough surfaces). The adhesion enhancement composition described herein may be applied locally, for quick, localized treatment of a rail, wheel or both rail and wheel surface in order to address low adhesion.

Figure 2:
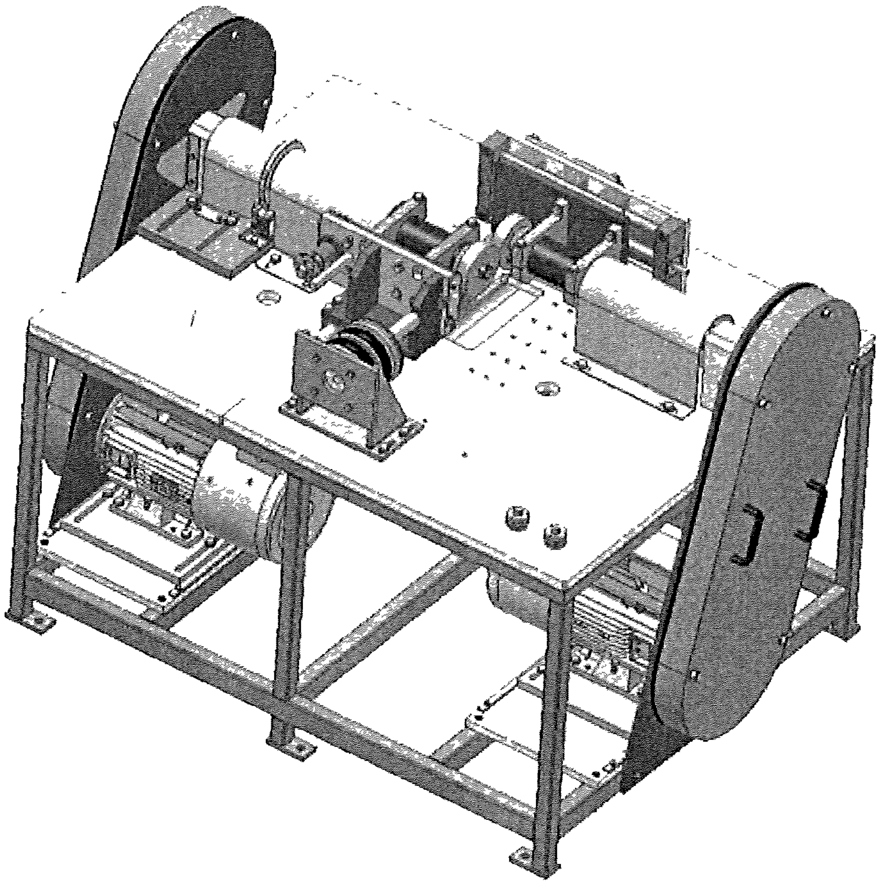
FIG. 2 shows a schematic view of a twin disc system that may be used to evaluate the properties of the particulate adhesion enhancement composition as described herein

Adhesion may be measured using several devices, for example, a train-mounted wheel slide and wheel slip detection system (e g. detecting wheel rotation speed and any difference between the rotation speeds of two wheels; U.S. Pat. Nos. 4,071,282; 3,867,647), or in a lab, a pin on disc machine, a ball on disc machine, or a twin disc machine as described herein (see FIG. 2). Using the twin disc machine as described herein, adhesion may be characterized by evaluating the rate of change in the coefficient of traction (CoT), between the twin disks, following the application of a test material or component to the twin-disk machine. In this system, a rate of the CoT increase is an indicator of adhesion enhancement, or an increase in adhesion. The rate of change of the CoT following application of a test material may be compared with that of a standard or control material, for example sand. A greater increase in the rate of change of the coefficient of traction following application of a test material when compared to the control material (sand) is indicative of an increased or enhanced adhesion. Under field conditions, increased adhesion results in an increase in traction and reduced wheel slide and wheel slip A rate of CoT increase between about 0 001 1/s to about 0.039 1/s or any amount therebetween, as determined using the twin disc apparatus described herein, is indicative of a material or a composition comprising a material that is effective as an adhesion enhancement agent For example, a rate of CoT increase between 0.001 1/s, 0 012 1/s, 0.014 1/s, 0 016 1/s, 0.018 1/s, 0 020 1/s, 0 022 1/s, 0.024 1/s, 0.026 i/s, 0 028 1/s, 0.030 1/s, 0.032 1/s, 0 034 1/s, 0.036 1/s, 0.038 1/s, 0.039 1/s or any amount therebetween, is indicative of a material or a composition comprising a material that is effective as an adhesion enhancement agent.

As described above, the rate of change of traction was selected as a parameter to determine the effectiveness of a material, or composition, to increase adhesion between two steel surfaces. To be an effective material, the material should exhibit the property of rapidly increasing adhesion, as this property correlates to a minimally required level of adhesion for safe train operation. The effectiveness of a material to increase adhesion is to be contrasted with a material that only generates a high friction level over a longer period of time following application. Therefore, also described herein is a method of decreasing wheel slide and wheel slip in a rail system, comprising, applying a composition comprising, (a) a core, the core comprising one or more than one hard particle, each of the one or more than one hard particle having a Mohs hardness value of equal to or greater than 7, or a Vickers hardness of greater than or equal to 1000, and (b) a first coating over the core, the first coating comprising a resin and a conductivity additive, wherein the core comprises about 50% to about 99.8% (wt/wt) of the composition, the resin comprises about 0 1% to about 20% (wt/wt) of the composition, and the conductivity additive comprises about 0 1% to about 10% (wt/wt) of the composition, to a rail surface at a rate sufficient to increase traction between a wheel and the rail surface.

A method is also provided for decreasing wheel slide and wheel slip in a rail system, comprising, applying a composition comprising, (a) a core, the core comprising one or more than one hard particle, each of the one or more than one hard particle having a Mohs hardness value of equal to or greater than 7, or a Vickers hardness of greater than or equal to 1000, and (b) a first coating over the core, the first coating comprising a resin and a conductivity additive, wherein the core comprises about 50% to about 99 8% (wt/wt) of the composition, the resin comprises about 0 1% to about 20% (wt/wt) of the composition, and the conductivity additive comprises about 0.1% to about 10% (wt/wt) of the composition, to one or both of the steel surfaces at a rate sufficient to increase traction between a wheel and the rail surface.

The coated adhesion enhancement composition or material may be prepared using any suitable method, for example mechanofusion, hybridization, magnetic assisted impaction coating, theta-composer, rotating fluidized bed coating, vacuum coating, pressure swing granulation, or high shear mixing. For example, the resin, all desired additives, and the one or more than one hard particle (core) component may be combined and mixed using a mixer Alternatively, the resin may be mixed with desired additives prior to addition to high hardness (core) component. All components are mixed together until full cure of the resin coating (mixing time depends on resin cure rates). Resin coated particle agglomerates should be broken into individual coated particles by using appropriate mixing, grinding, or both mixing and grinding Alternatively, the resin, comprising desired additives, may be applied onto the one or more than one hard particle (core) component using spraying equipment If a second coating is to be applied, the second coating may be applied on top of the first coating by either mixing with the particle comprising the first coating with the second coating material as described above, or the second coating material may be applied onto the particle comprising the first coating by spray, or other known methods. If required, re-coated particle agglomerates may be broken into individual coated particles by mixing, grinding, or both mixing and grinding The resultant coated composition is a mixture of dry particles and this material may be applied using standard train mounted dispensing mechanisms, nozzles, or applicators similar to those used to apply sand, or those described in U.S. Pat. Nos. 7,311,274; 6,722,589

EXAMPLES

Coated Adhesion Enhancement Compositions

The coated compositions as described herein comprise the following components

| Component | Composition (% wt/wt) |
|---|---|
| High hardness component (core) | 50-98% |
| Resin or polymer | 0.1-20% |
| Conductivity additive | 0.1-10% |
| Rheology additive | 0-10% |
| Anti-wear additive | 0-10% |
| Hydrophobic/hydrophilic coating | 0-10% |
| Anti-dust, antistatic additives | 0-10% |
| Other additives (pH, chelate, etc.) | 0-10% |

Manufacture of Adhesion Enhancement Composition

The compositions described herein may be manufactured by mixing the resin with the one or more than one hard particles and all additives using an appropriate mixer Alternatively, the resin may be mixed with all or selected additives prior to addition to the one or more than one hard particles The resin may be applied to the one or more than one hard particles using spraying equipment. All components are then mixed together until the resin coating is fully cured Thus, the mixing time depends on resin cure rates. The resin coated particle agglomerates may then be broken into individual coated particles by using appropriate mixing, grinding or other conditions, as would be known to a person of ordinary skill in the art Different second coatings may be applied in a similar way on top of the first coating

Twin Disk Machine

In the methods described herein, various conditions between two surfaces that are in sliding, slipping, rolling-sliding or rolling-slipping contact with each other may be simulated in a laboratory setting by using a twin disc machine (see FIG. 2) and exposing the discs to a variety of conditions, such as low adhesion conditions. Both discs of the twin disk machine were obtained from premium rail and machined to a diameter of 50-55 mm with a contact track width of 10 mm. Tests were performed with one of the discs rotating at faster speed than the other to simulate wheelset acceleration/braking (creep).

Conductivity Additives

The extent of a composition's conductivity was derived from contact potential measurements between two discs using a twin disc instrument The discs were electrically isolated from each other, which allowed for the creation of millivolt potential in a Lunn-Furey electrical contact resistance circuit, Application of conductive materials into the contact area of two discs in contact did not disturb the circuit and the contact potential remained close to 0 mV However, application of non-conductive materials resulted in full electrical isolation of the discs, which creates a contact potential of up to 52 7 mV (full isolation) Tests were conducted with 2 g of test material applied directly into the contact area of two rotating discs at 20 rpm speed, ~1000 MPa contact pressure (about 3.6 kN load) and 10% slip (creep)

Figure 3:
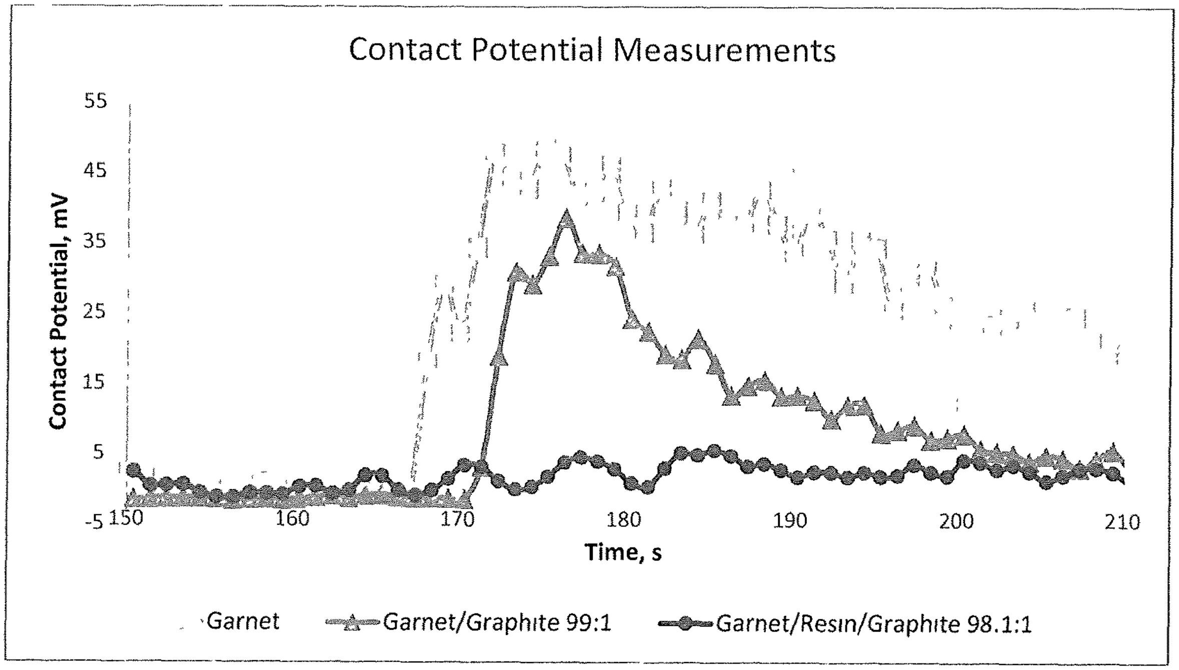
FIG. 3 shows a graphical representation of contact potential changes between two steel surfaces that are in sliding, slipping, rolling-sliding or rolling-slipping contact with each other upon addition of 2 g samples of thoroughly mixed pure garnet (square), a mixture (thoroughly mixed) comprising garnet and graphite in a ratio of 99 1 (triangle), and a composition comprising a garnet core, and a coating of resin and graphite (applied as one layer), in a ratio of 98'1:1 for the composition (circle). The twin disc machine was run under dry conditions at 20 rpm, approximately 1000 MPa contact pressure and 10% slip, for 20 cycles followed by addition of each product at around 169 s.
Figure 4:
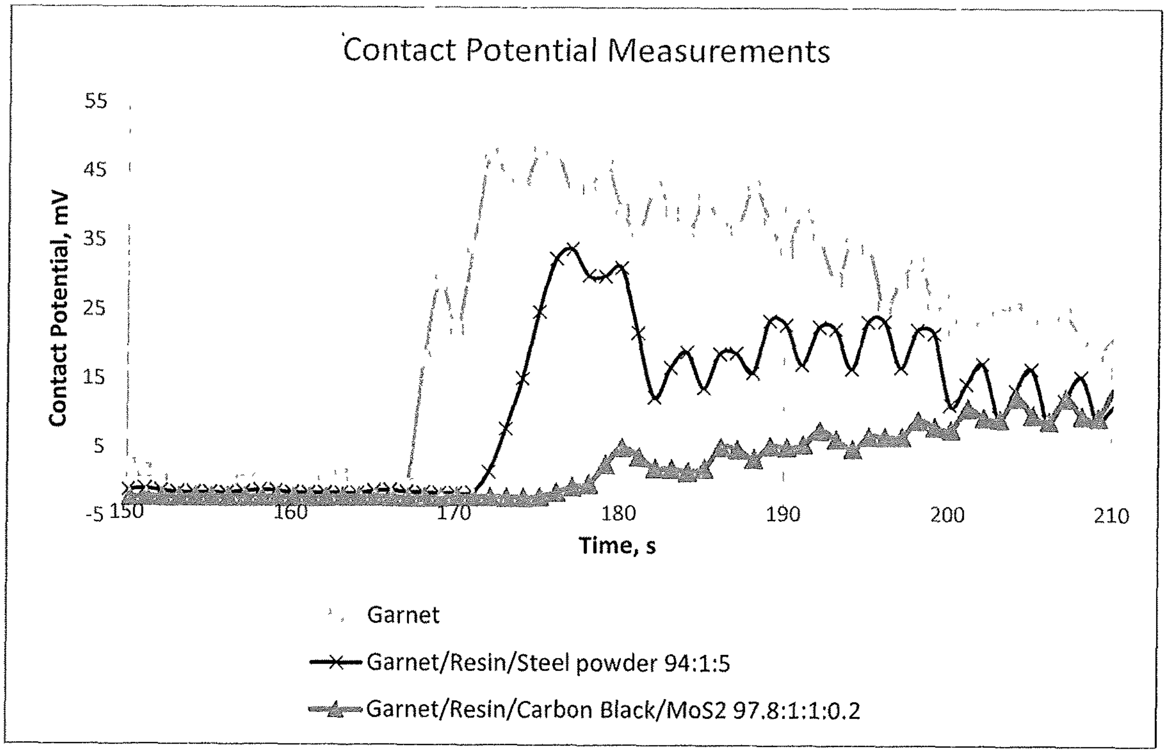
FIG. 4 shows a graphical representation of contact potential changes between two surfaces that are in sliding, slipping, rolling-sliding or rolling-slipping contact with each other upon addition of 2 g samples of thoroughly mixed pure garnet (square), a composition comprising a garnet core, and a coating of resin and steel powder (applied as one layer), in a ratio of 94:1:5 for the composition ('X'), and a composition comprising a garnet core, and a coating of resin, carbon black and $MoS_2$ (applied as one layer), in a ratio of 97 8 1.1.0.2 for the composition (triangle). The twin disc machine was run under dry conditions at 20 rpm, approximately 1000 MPa contact pressure and 10% slip for 20 cycles followed by addition of a product at around 169 s.

Addition of conductivity additives, such as graphite (FIG. 3), metal or steel powder and carbon black (FIG. 4), into the coating significantly improved the electrical conductivity properties of the adhesion enhancing compositions during their application between two surfaces that are in sliding, slipping, rolling-sliding or rolling-slipping contact with each other. As shown in FIG. 3, application of 2 g of a composition comprising a garnet core and a coating comprising resin and graphite in a ratio of 98·1 1 for the composition (circle) provides significantly lower contact potential values of up to 5.6 mV in comparison with 2 g of pure garnet (square) which resulted in a maximum contact potential reaching 48.4 mV. Application of 2 g of a mixture of garnet and graphite in a ratio of 99·1 without a resin coating (triangle) provided a relatively high contact potential of up to 38 6 mV, which also corresponds to poorer conductivity. These results also illustrate significant differences between conventional dry mixtures of garnet and graphite compared to the coated particles described herein, with the latter, aside from exhibiting a high contact potential, also being more stable and less prone to segregation or separation Other conductivity additives, such as metal powder, steel powder, or carbon black, may be used for improving conductivity performance of adhesion enhancing compositions As shown in FIG. 4, application of 2 g of a composition comprising a garnet core and a coating of resin and steel powder in a ratio of 94 1:5 for the composition ('X') provides significantly lower contact potential values of up to 33.9 mV in comparison with 2 g of garnet (square), with maximum contact potential reaching 48.4 mV. Addition of conductive carbon black (triangle) also significantly lowers the contact potential to values of up to 11 mV as shown in FIG. 4 after addition of 2 g of a composition comprising a garnet core and a coating of resin, carbon black and $MoS_2$ in a ratio of 97.8:1-1 0.2. This Example demonstrates the improved contact potential between surfaces that are in sliding, slipping, rolling-sliding or rolling-slipping contact with each other following application of a composition comprising a coated hard particle, wherein the coating comprises a conductivity additive. As one of skill would understand, other conductivity materials, in addition to those tested in FIGS. 3 and 4, for example but not limited to, aluminum powder, $Fe_3O_4$, a conductive polymer, a conductive fiber, conductive nanomaterials metal nanoparticles, carbon nanotubes, or graphene, or a combination thereof, may be used to ensure conductivity of the coated composition.

Figure 5:
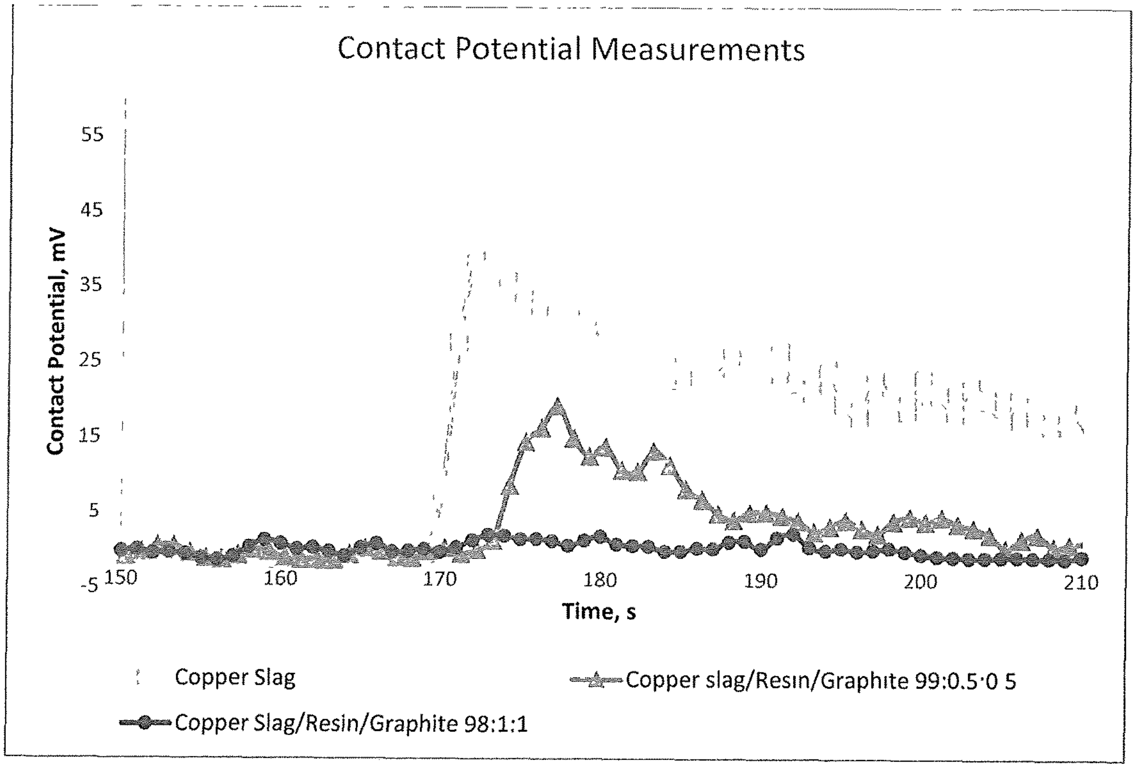
FIG. 5 shows a graphical representation of contact potential changes between two surfaces that are in sliding, slipping, rolling-sliding or rolling-slipping contact with each other upon addition of 2 g samples of a thoroughly mixed pure copper slag (square), a composition comprising a copper slag core, and a coating of resin and graphite (applied as one layer), in a ratio of 99-0.5:0.5 for the composition (triangle), and a composition comprising a copper slag core, and a coating of resin and graphite (applied as one layer), in a ratio of 98 1:1 for the composition (circle). The twin disc machine was run under dry conditions at 20 rpm, approximately 1000 MPa contact pressure and 10% slip for 20 cycles followed by addition of a product at around 169 s

The amount of conductivity additive in the composition may impact the conductivity performance of adhesion enhancing compositions. As shown in FIG. 5, application of 2 g of a composition comprising a copper slag core and a coating of resin and graphite in a ratio of 98-1 1 for the composition (circle) provides significantly lower contact potential values of up to 2 3 mV in comparison with application of 2 g of a composition comprising a lower amount of graphite (copper slag core and a coating of resin and graphite in a ratio of 99:0 5 0.5 for the composition; triangle) which resulted in a contact potential up to 19 3 mV Both of the latter compositions were more conductive than pure garnet (square), which exhibited a contact potential up to 38.5 mV.

Figure 6:
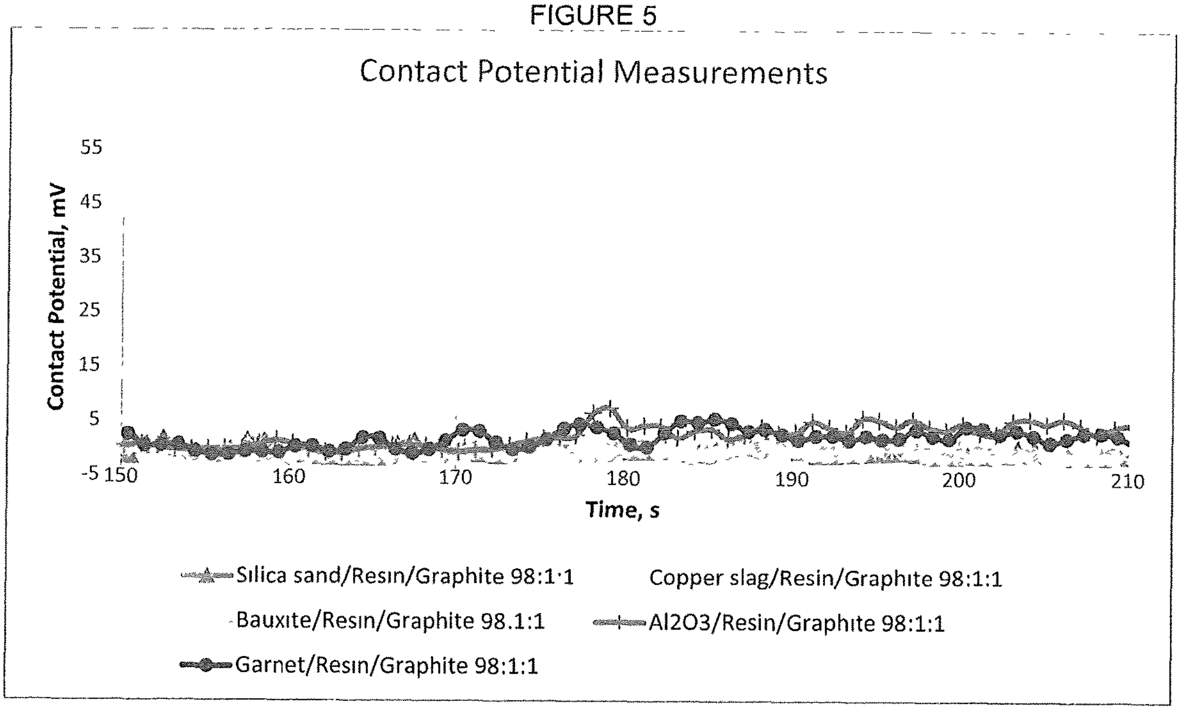
FIG. 6 shows a graphical representation of contact potential changes between two surfaces that are in sliding, slipping, rolling-sliding or rolling-slipping contact with each other upon addition of 2 g samples of a composition comprising a silica sand (triangle), bauxite (grey circle), garnet (black circle), copper slag ('X'), or $Al_2O_3$('+') core, and a coating of resin and graphite (applied as one layer) in a ratio of 98 1 1 for the composition The twin disc machine was run under dry conditions at 20 rpm, approximately 1000 MPa contact pressure and 10% slip for 20 cycles followed by addition of a product at around 169 s
Figure 7:
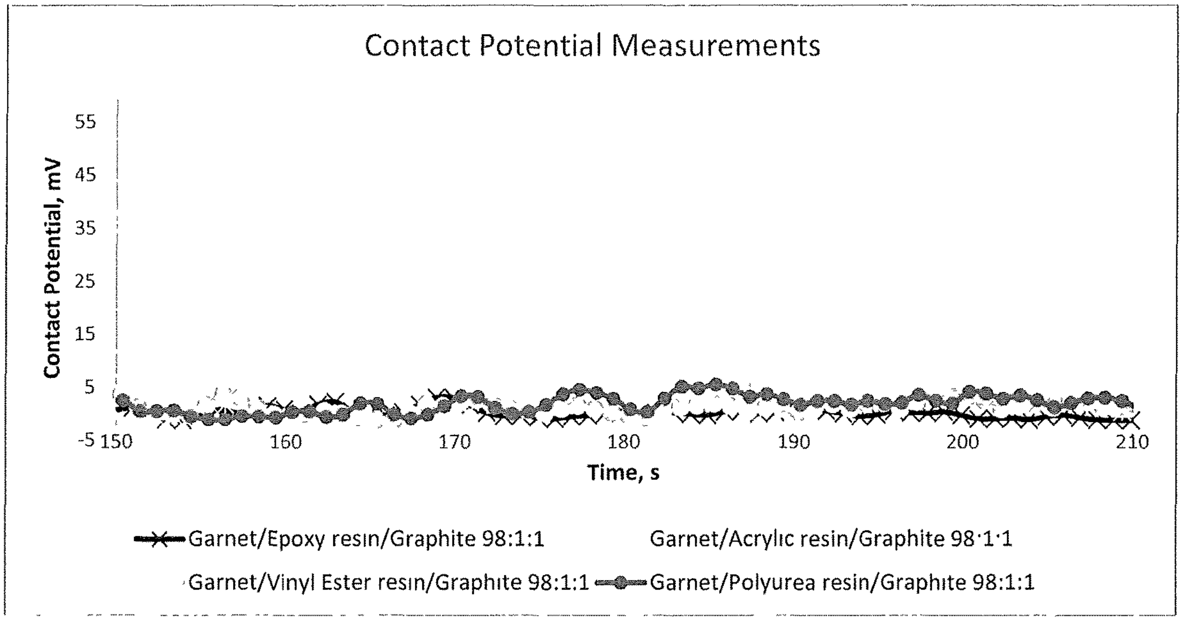
FIG. 7 shows a graphical representation of contact potential changes between two surfaces that are in sliding, slipping, rolling-sliding or rolling-slipping contact with each other upon addition of 2 g samples of a composition comprising a garnet core, and a coating of resin and graphite (applied as one layer), in a ratio of 98:1.1 for the composition, wherein the resin is an epoxy resin (dark 'X'), a vinyl ester resin (grey circle), an acrylic resin (grey 'X') or a polyurea resin ((dark circle) The twin disc machine was run under dry conditions at 20 rpm, approximately 1000 MPa contact pressure and 10% slip for 20 cycles followed by addition of a product at around 169 s.

The presence of a conductivity additive in the coating improves conductivity performance of a variety of core materials (hard particles) As shown in FIG. 6, application of 2 g of a composition comprising a variety of hard particles each coated with resin and graphite in a ratio of 98.1·1 for the composition provides relatively low contact potential values of up to 2 3 mV. The hard particles tested were silica sand, bauxite, garnet, copper slag or $Al_2O_3$. As one of skill in the art would understand, other hard particle, core materials (characterized as having a Mohs hardness value of equal to or greater than 5, or a Vickers hardness of greater than or equal to 1000), in addition to those tested in FIG. 6, for example but not limited to, topaz, copper slag, alumina (such as, for example, alumina calcined #A-12 #325), boron nitride, diamond, nanocrystalline diamond, polymerized $C_{60}$, carbide based compounds, silicon carbide (such as, for example, silicon carbide black #280), boron carbide (such as, for example, boron carbide black #280), amphoteric oxide based compounds, fullerite, staurolite, olivine, goethite, ZnO, steel slag, coal slag, MgO, $Fe_2O_3$, zirconium oxide based compounds, alumina zirconia ($Al_2O_3/ZrO_2$), $ZrO_2$, $Al_2O_3$, aluminium oxide white, brown aluminium oxide (such as, for example, brown aluminium oxide #280), or a combination thereof, may be used to enhance, or modify, adhesion, and these hard particles may be coated as described herein to produce a coated composition, that exhibits the property of conductivity Different polymers or resins may be used for incorporation of conductivity additives into the composition. As shown in FIG. 7, application of 2 g of compositions comprising a garnet core and a coating of resin and graphite in a ratio of 98:1:1 for the composition provides relatively lower contact potential values of up to 14 mV The resins tested were epoxy resin, vinyl ester resin, acrylic resin and polyurea resin As one of skill in the art would understand, other polymers or resins, in addition to those tested in FIG. 7, may be used to coat the core, or hard particle, for example, but not limited to polyurethane, phenolic, polyester, wax, alkyd or furan, and a combination thereof. Unless otherwise stated, polyurea was selected as an exemplary resin from a range of other resins for the examples described herein (FIGS. 3 to 6 and 8 to 13).

Lubricant/Anti-Wear Additives

The presence of lubricating additives and/or anti-wear additives, such as graphite (which can act as both a conductivity additive and a lubricating/anti-wear additive), zinc dialkyl dithio phosphate (ZDDP), $MoS_2$, etc., in a composition comprising a hard particle as the core and a resin coating may provide desirable lower/intermediate friction levels and less wear when applied between two surfaces that are in sliding, slipping, rolling-sliding or rolling-slipping contact with each other.

Figure 8:
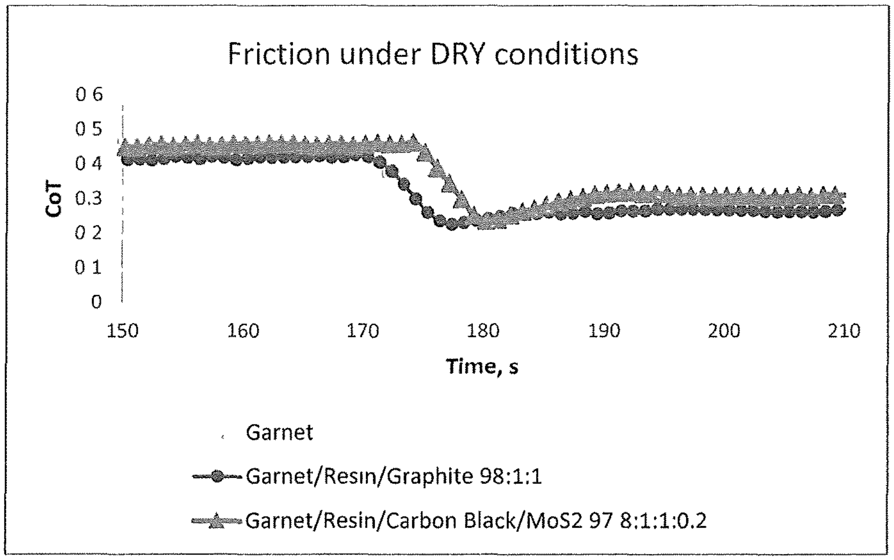
FIG. 8 shows a graphical representation of coefficient of traction (CoT) changes between two surfaces that are in sliding, slipping, rolling-sliding or rolling-slipping contact with each other upon addition of 2 g samples of thoroughly mixed pure garnet (square), a composition comprising a garnet core, and a coating of resin and graphite (applied as one layer), in a ratio of 98 1:1 for the composition (circle), and a composition comprising a garnet core, and a coating of resin, carbon black and $MoS_2$ (applied as one layer), in a ratio of 97.8.1:1 0.2 for the composition (triangle). The twin disc machine was run under dry conditions at 20 rpm, approximately 1000 MPa contact pressure and 10% slip for 20 cycles followed by addition of a product at around 169 s.

As shown in FIG. 8, application of 2 g of pure garnet or a composition comprising a garnet core and a coating of resin and graphite in a ratio of 98:1:1 for the composition at around 169 s provided an initial decrease in the CoT followed by a gradual increase. The composition with graphite as a lubricant component provided a significantly lower friction level (CoT<0.3) in comparison to garnet (alone) which had a CoT reaching up to 0.52 after application. A similar low friction level was observed with application of a composition comprising a garnet core and a coating of resin, carbon black and $MoS_2$ in a ratio of 97.8.1 1.0.2 for the composition.

As one of skill would understand, other additives, in addition to those tested in FIG. 8, may be added to the coating compositions described herein Examples of additional antiwear additives may include, but are not limited to, sulfur-based additives, phosphorus-based additives, zinc dialkyldithiophosphates, tungsten disulfide, or a combination thereof. Anti-dust additives may also be added to the coating layer, for example, but not limited to, oil-based, polymer or surfactant-based dust suppressants, or a combination thereof. Anti-static additives may include ionic and non-ionic anti-static agents such as amines and amides, quaternary ammonium, phosphonium or sulfonium salts; esters or ethoxylated amines of phosphoric acid; glycol esters; polyols or a combination thereof. Other additives may include chelate ligands such as EDTA, ethylenediamine, acetylacetonate and pH additives such as different acids, bases and amphoteric compounds.

Low Adhesion Conditions—High Hardness Components

Figure 9:
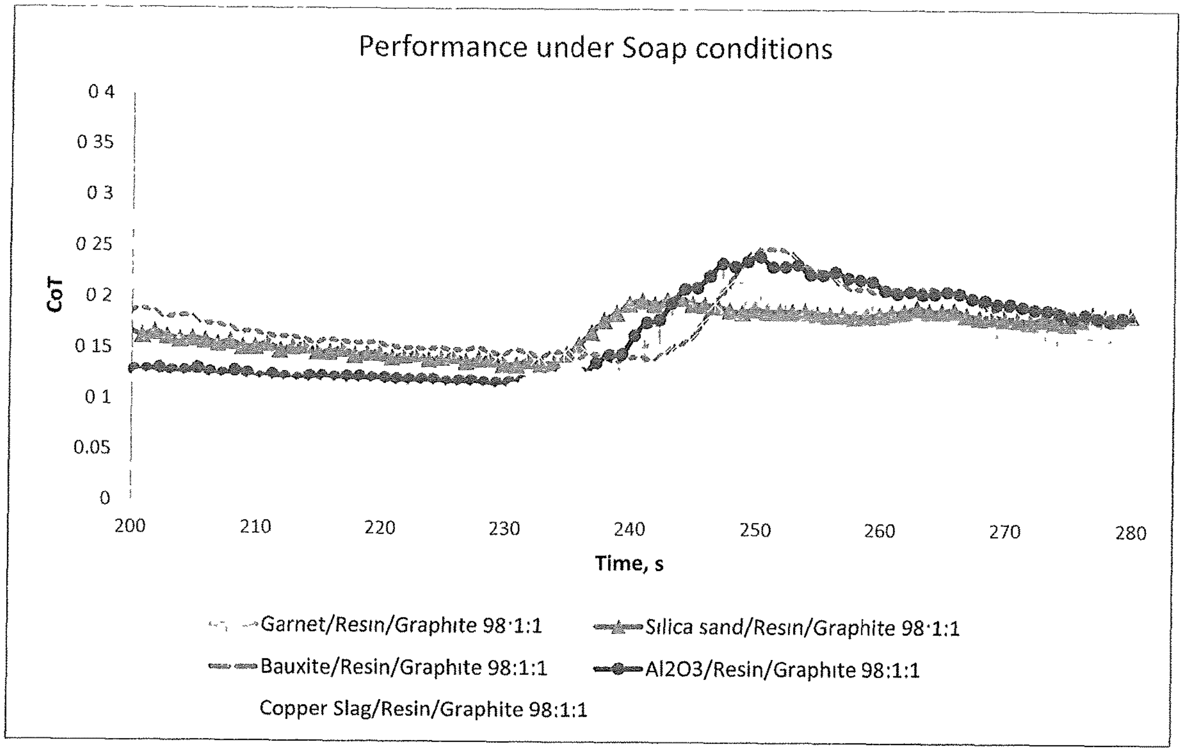
FIG. 9 shows a graphical representation of coefficient of traction (CoT) changes between two surfaces that are in sliding, slipping, rolling-sliding or rolling-slipping contact with each other and contaminated with soap water upon addition of a 100 mg sample of a composition comprising a garnet (square), bauxite ('X'), copper slag (large circle), silica sand (triangle) or $Al_2O_3$(small circle) core and a coating of resin and graphite (applied as one layer), in a ratio of 98 1.1 for the composition The twin disc machine was run under dry conditions at 20 rpm, approximately 1000 MPa contact pressure and 10% slip for 20 cycles. Soap water was added to the contact area of the rotating discs at a rate of 0 4 mL/min for a further 20 cycles. Soap water application was stopped and 100 mg of product was then applied at around 235 s.

The ability of adhesion enhancing compositions to increase friction levels was tested on a twin disc machine by application of 100 mg of product between two surfaces contaminated with soap water that were in sliding, slipping, rolling-sliding or rolling-slipping contact with each other. The twin disc machine was run under dry conditions at 20 rpm, approximately 1000 MPa contact pressure and 10% slip for 20 cycles. Soap water was added to the contact area of the rotating discs at a rate of 0.4 mL/min for 20 cycles. Addition of soap water resulted in a rapid drop in traction levels between the rotating discs. Soap water application was stopped and 100 mg of product was then applied (at about 235 s, FIG. 9). The products were coated compositions comprising a hard particle and a coating of resin and graphite in a ratio of 98:1 1 for the composition. The hard particles tested were silica sand, bauxite, garnet, copper slag and $Al_2O_3$. As shown in FIG. 9, all of the compositions showed an increase in the CoT upon application at about 235 s Silica sand and copper slag provided the fastest increase in CoT, followed by $Al_2O_3$, garnet and bauxite. However, bauxite and $Al_2O_3$ provided the largest increase in CoT, while copper slag provided the lowest increase.

Figure 10:
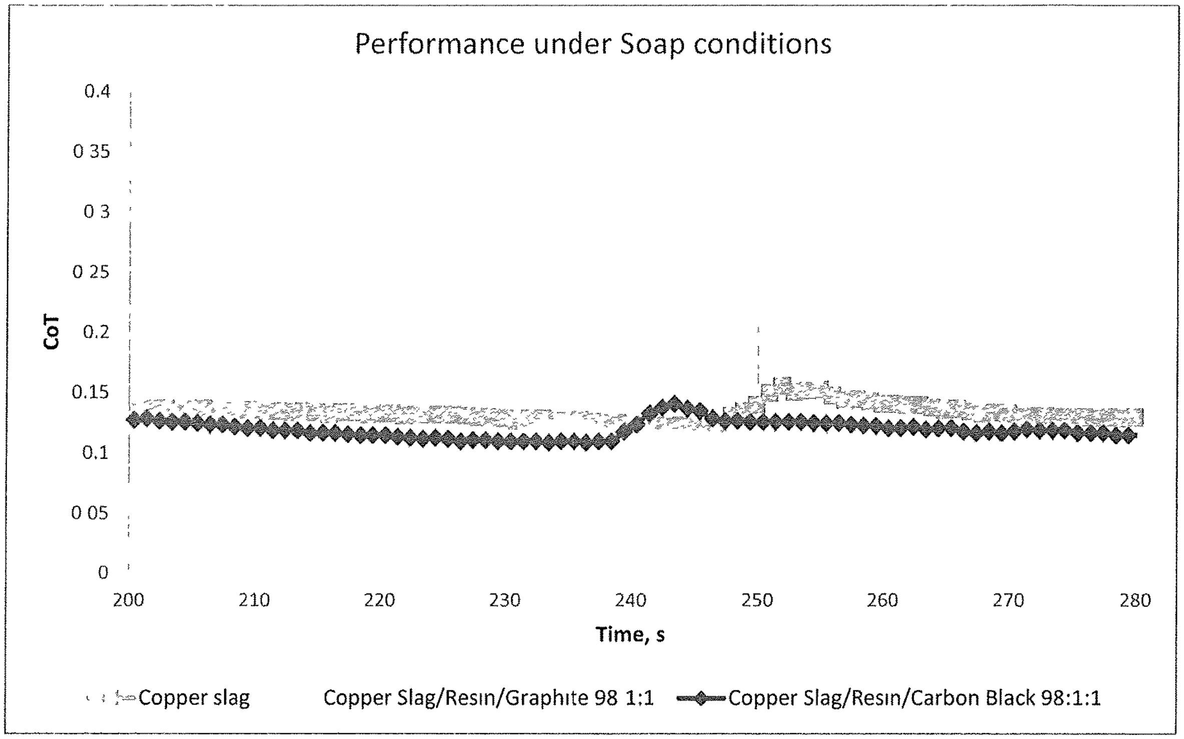
FIG. 10 shows a graphical representation of coefficient of traction (CoT) changes between two surfaces that are in sliding, slipping, rolling-sliding or rolling-slipping contact with each other and contaminated with soap water upon addition of a 100 mg sample of thoroughly mixed pure copper slag (square), a composition comprising a copper slag core, and a coating of resin and carbon black (applied as one layer), in a ratio of 98 1:1 for the composition (diamond), or a composition comprising a copper slag core, and a coating of resin and graphite (applied as one layer), in a ratio of 98:1:1 for the composition (circle). The twin disc machine was run under dry conditions at 20 rpm, approximately 1000 MPa contact pressure and 10% slip for 20 cycles. Soap water was added to the contact area of the rotating discs at a rate of 0 4 mL/min for another 20 cycles Soap water application was stopped and 100 mg of product was then applied at around 235 s

A composition comprising a copper slag core and a coating of resin and graphite in a ratio of 98:1:1 for the composition demonstrated only a minor increase in the CoT upon addition under soap conditions (FIG. 10), although this increase was better than addition of copper slag on its own. If desired, addition of a conductivity additive that is more lubricating than graphite may lower the adhesion enhancing ability even further. Addition of a less lubricating conductivity additive, such as carbon black, to the coating increased the adhesion enhancing properties of the composition (FIG. 10). As shown in FIG. 10, the addition of resin/carbon black coating to a copper slag core resulted in a higher CoT, when compared with a coated composition comprising copper slag and a coating of resin/graphite, both in a ratio of 98 1 1 for the composition. This result demonstrates that, in addition to the material used for the hard particle, the coefficient of traction (CoT) of a coated composition may also be modified (i.e increased and/or decreased) by changing the additives used in the coating composition.

Figure 11:
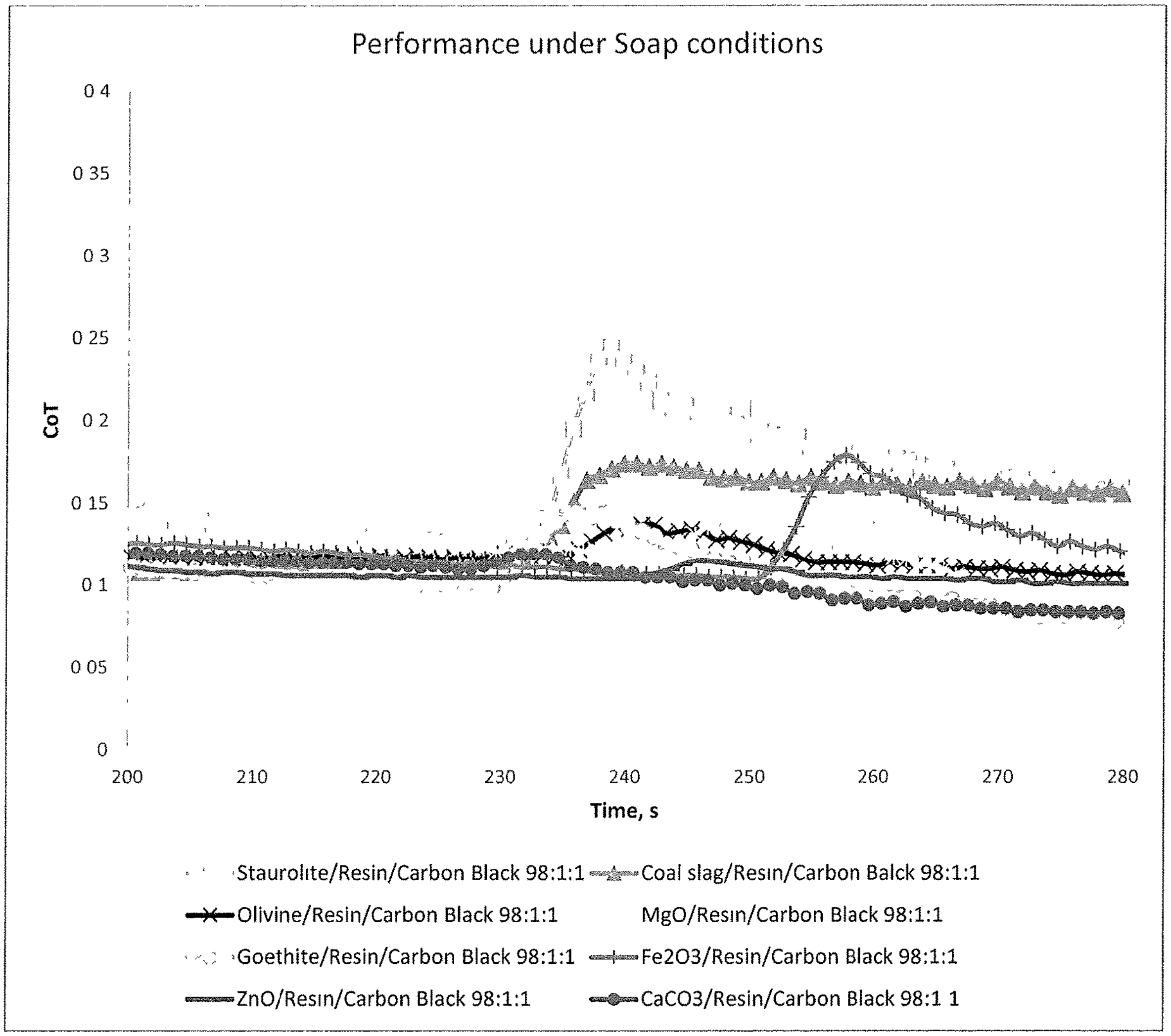
FIG. 11 shows a graphical representation of coefficient of traction (CoT) changes between two surfaces that are in sliding, slipping, rolling-sliding or rolling-slipping contact with each other and contaminated with soap water upon addition of a 100 mg sample of a composition comprising a staurolite (square), olivine (dark 'X'), goethite (grey circle), ZnO ('+'), coal slag (triangle), MgO (grey 'X'), $Fe_2O_3$((line) or $CaCO_3$ (dark circle) core, and a coating of resin and graphite (applied as one layer), in a ratio of 98'1.1 for the composition. The twin disc machine was run under dry conditions at 20 rpm, approximately 1000 MPa contact pressure and 10% slip for 20 cycles. Soap water was added to the contact area of the rotating discs at a rate of 0 4 mL/min for another 20 cycles. Soap water application was stopped and 100 mg of product was then applied at around 235 s.

The hardness characteristics of the core have a significant impact on the adhesion enhancing performance of the compositions. As depicted in FIG. 11, all compositions with a hard particle core having a Mohs hardness greater than 5, such as staurolite, olivine, goethite, coal slag, MgO and $Fe_2O_3$, exhibited increased adhesion enhancing characteristics under soap contaminated conditions. On the other hand, compositions with a softer core, such as ZnO and $CaCO_3$, exhibited low or no adhesion enhancing characteristics under the same test conditions As one of skill in the art would understand, other hard particle, core materials (characterized as having a Mohs hardness value of equal to or greater than 5, or a Vickers hardness of greater than or equal to 1000), in addition to those tested in FIGS. 9-11, for example but not limited to, alumina (such as, for example, alumina calcined #A-12 #325), silica sand, silicon carbide (such as, for example, silicon carbide black #280), boron carbide (such as, for example, boron carbide black #280), silicon carbide, alumina zirconia ($Al_2O_3/ZrO_2$), $ZrO_2$, aluminium oxide white, brown aluminium oxide (such as, for example, brown aluminum oxide #280), or a combination thereof, may be used to modify adhesion Low Adhesion Conditions—Rheology Additives Addition of rheology modifying additives, such as, for example, xanthan gum and carboxymethyl cellulose (CMC), into the coating of adhesion enhancing compositions may facilitate restoration of higher friction levels in low adhesion conditions As shown in FIG. 12, application of 100 mg of compositions comprising a garnet core and a coating of resin, rheology additive (either CMC; dark circle, or xanthan gum; medium dark circle) and graphite at a ratio of 97 1:1 1 for the composition provided faster restoration of friction levels (before 500 s) in comparison with a mixture of garnet, rheology additive and graphite (CMC, light circle and xanthan gum; medium light circle), which provide restoration of friction levels after 680 s.

Furthermore, application of 100 mg of the mixture of garnet, rheology additive and graphite at around 235 s provided a significantly higher initial CoT of up to 0 32 in comparison with analogous resin-coated compositions. However, as noted above, the initial increase in the CoT observed using the mixture was of a short duration and reduced to starting CoT values when compared to the change in CoT observed using coated compositions where the increase in CoT was maintained after application These test results further illustrate the difference between conventional dry mixtures and the resin-coated compositions as described herein.

Figure 12:
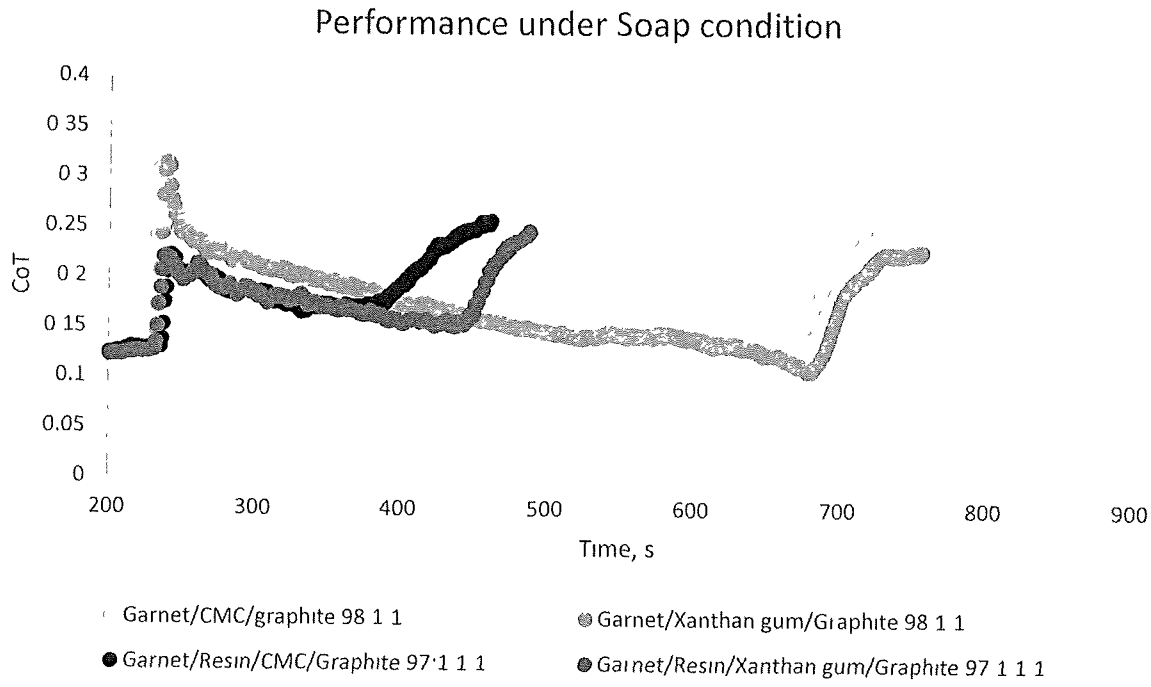
FIG. 12 shows a graphical representation of coefficient of traction (CoT) changes between two surfaces that are in sliding, slipping, rolling-sliding or rolling-slipping contact with each other and contaminated with soap water upon addition of a 100 mg sample of a composition comprising a garnet core, and a coating of CMC and graphite (applied as one layer), in a ratio of 98 1:1 for the composition (light grey circle), a composition comprising a garnet core, and a coating of resin, CMC and graphite (applied as one layer), in a ratio of 97.1:1:1 for the composition (dark circle), a composition comprising a garnet core, and a coating of xanthan gum and graphite (applied as one layer), in a ratio of 98 1 1 for the composition (medium light circle), or a composition comprising a garnet core, and a coating of resin, xanthan gum and graphite (applied as one layer), in a ratio of 97.1:1.1 for the composition (medium dark circle) The twin disc machine was run under dry conditions at 20 rpm, approximately 1000 MPa contact pressure and 10% slip for 20 cycles. Soap water was added to the contact area of the rotating discs at a rate of 0.4 mL/min for a further 20 cycles Soap water application was stopped and 100 mg of product was then applied at around 235 s

As one of skill in the art would understand, other rheological modifying additives, in addition to those tested in FIG. 12, may be used within the coat layer of the coated compositions described herein, for example but not limited to an organic polymer absorbent, an acrylic, a superabsorbent polymer, other cellulosic materials, for example carboxy-hydroxymethyl cellulose (CHMC; METHOCEL™), ethoxymethyl cellulose (EMC), a polysaccharide (for example, chitosan or a starch), alternate gums, for example Vanzan™, Vanzan™ D, or CCL xanthan gum, a guar gum, or any combination thereof.

Hydrophobic Additives

Figure 13:
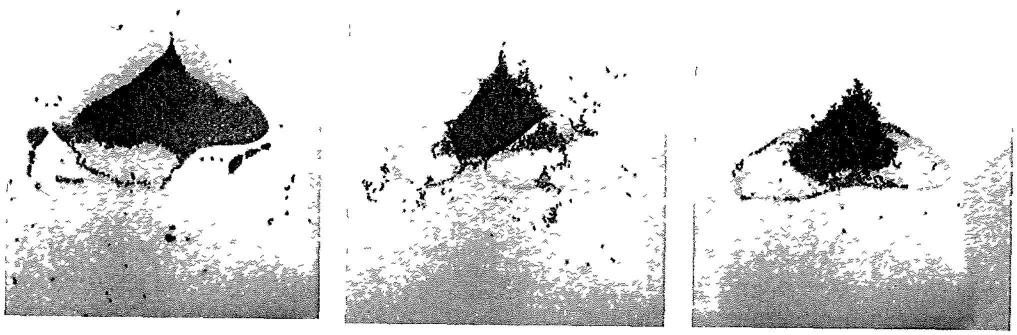
FIG. 13 shows images of 1 g samples of different adhesion enhancement compositions in the presence of 1 g of water. The composition on the left comprises a garnet core and a coating of resin and graphite in a ratio of 98 1 1 for the composition. The composition in the centre comprises a garnet core and a coating of resin, graphite and Aerosil R972 fumed silica in a ratio of 97.5:1 1.0.5 for the composition. The composition on the right comprises a garnet core and a coating of resin, graphite and silicone in a ratio of 88 1:1:10 for the composition.

Hydrophobic surface properties of adhesion enhancing compositions may significantly improve the flow properties of the compositions, which simplifies refilling processes and application of such materials through applicators Hydrophobic, adhesion enhancing compositions are less prone to clumping under humid conditions. In cases where the polymeric or resin coated compositions do not exhibit a desired level of hydrophobicity, addition of hydrophobic additives or a coating layer, such as, for example, wax, silicone and hydrophobic silica, may further improve the compositions As shown in FIG. 13, the hydrophobic properties of the composition comprising a garnet core and a coating of resin and graphite (this composition is hydrophilic as indicated by water spreading our over the composition, image on the left in FIG. 13) can be modified by the addition of hydrophobic fumed silica (Aerosil R972™ fumed silica, in a ratio of 97.5·1·1 0.5 of garnet:resin-graphite fumed silica), or silicone components (in a ratio of 88.1:1 10 of garnet:resin graphite silicone), which resulted in increased hydrophobicity (poor wettability by water as indicated by water pooling, images in the centre and on the right of FIG. 13) In addition to the compounds listed in FIG. 13, other hydrophobic or hydrophilic components may also be used, for example siloxane, wax oil, or a combination thereof.

It is contemplated that any part of any aspect or embodiment discussed in this specification can be implemented or combined with any part of any other aspect or embodiment discussed in this specification While particular embodiments have been described in the foregoing, it is to be understood that other embodiments are possible and are intended to be included herein It will be clear to any person skilled in the art that modification of and adjustment to the foregoing embodiments, not shown, is possible.

What is claimed is:

1. A particle, the particle comprising:

(a) a core, the core comprising one or more than one hard particle, each of the one or more than one hard particle having a Mohs hardness value of equal to or greater than 5, or a Vickers hardness of greater than or equal to 1000 and selected from the group of garnet, copper slag, silica sand, bauxite, $Al_2O_3$, staurolite, olivine, goethite, coal slag, MgO and $Fe_2O_3$, the core comprising about 70% to about 99.8% (wt/wt) of the particle; and (b) a coating over the core, the coating over the core comprising a resin and a conductivity additive, the resin comprising about 0.1% to about 20% (wt/wt) of the particle, and the conductivity additive comprising about 0.1% to about 10% (wt/wt) of the particle, wherein the conductivity additive is one or more of carbon black, graphite, metal powder, $Fe_3O_4$, steel powder, graphene, a conductive fiber, metal nanoparticles or carbon nanotubes.

2. The particle of claim 1, wherein the conductivity additive is carbon black or steel powder.

3. The particle of claim 1, wherein the resin is selected from the group of polyurethane, polyurea, epoxy, phenolic, vinyl ester, polyester, acrylic, alkyd, furan and any combination thereof.

4. The particle of claim 3, wherein the coated composition comprises an additional hydrophobic coating over the coating over the core or an additional hydrophilic coating over the coating over the core.

5. The particle of claim 1, wherein the particle has a diameter between about 100 and about 4000 microns.

6. The particle of claim 1, wherein the one or more than one hard particle has a particle size between about 100 and about 2000 microns.

7. The particle of claim 1, wherein the conductivity additive has a particle size of less than 1000 μm.

8. The particle of claim 1, wherein the coating over the core further comprises one or more rheology additive.

9. The particle of claim 8, wherein the rheology additive is one or more of a xanthan gum, a guar gum, an organic polymer absorbent, a cellulosic material or a polysaccharide, and wherein the rheology additive comprises up to about 10% (wt/wt) of the particle.

10. The particle of claim 9, wherein the rheology additive has a particle size of less than 1000 μm.

11. The particle of claim 1, wherein the coating over the core further comprises one or more of an anti-wear additive, an anti-dust additive or an anti-static additive.

12. A method of increasing adhesion between two steel surfaces that are in sliding, slipping, rolling-sliding or rolling-slipping contact with each other, the method comprising applying particles to a rail surface at a rate sufficient to increase the adhesion between the two steel surfaces, each of the particles comprising:

(a) a core, the core comprising one or more than one hard particle, each of the one or more than one hard particle having a Mohs hardness value of equal to or greater than 5, or a Vickers hardness of greater than or equal to 1000 and selected from the group of garnet, copper slag, silica sand, bauzite, $Al_2O_3$, staurolite, olivine, goethite, coal slag, MgO and $Fe_2O_3$, the core comprising about 70% to about 99.8% (wt/wt) of the particle; and (b) a coating over the core, the coating over the core comprising a resin and a conductivity additive, the resin comprising about 0.1% to about 20% (wt/wt) of the particle, and the conductivity additive comprising about 0.1% to about 10% (wt/wt) of the particle, wherein the conductivity additive is one or more of carbon black, graphite, metal powder, $Fe_3O_4$, steel powder, graphene, a conductive fiber, metal nanoparticles or carbon nanotubes.

* * * * *